2,754,693

LUBRICATING MECHANISM FOR CENTRIFUGAL SEPARATOR DRIVE

John F. Tholl and David M. Tholl, Needham, Mass., assignors to American Tool & Machine Company, Boston, Mass., a corporation of Massachusetts Application September 20, 1952, Serial No. 310,684

1 Claim. (Cl. 74—665)

This invention relates to a positive speed unloading drive for centrifugal separators, and more particularly to an improved lubricating mechanism for a multi-speed centrifugal drive which includes a relatively low speed unloading drive.

In certain types of centrifugal separators it is desirable to employ a relatively low speed unloading drive mechanism which is superimposed on the main drive and which can be selectively moved into and out of driving relationship with the centrifugal basket. Because of the nature of the centrifugal construction, the unloading drive is usually located above the main drive, and a problem in furnishing lubrication for the moving parts has developed. Attempts to provide lubricating devices based on the use of pumping systems and valve structures have not been successful. This is due, in part, to the particular arrangement of elements which are involved and also to the fact that lubrication must be provided for two different driving systems which operate in totally different speed ranges and which must be readily interchangeable. The greatest difficulty is found in supplying an adequate amount of lubricating oil to the top portions of the low speed unloading drive mechanism.

The present invention is concerned with this lubrication and unloading drive problem and aims to devise a mechanism for positively supplying oil to all parts of the driving system and to avoid any difficulty such as has heretofore developed out of the use of valves or pumping mechanisms. It is also an object of the invention to devise a simple, efficient, and easily constructed apparatus which can be readily combined with conventional high speed driving mechanisms without interference with, or change in, essential parts of this main driving mechanism.

Figure 1:
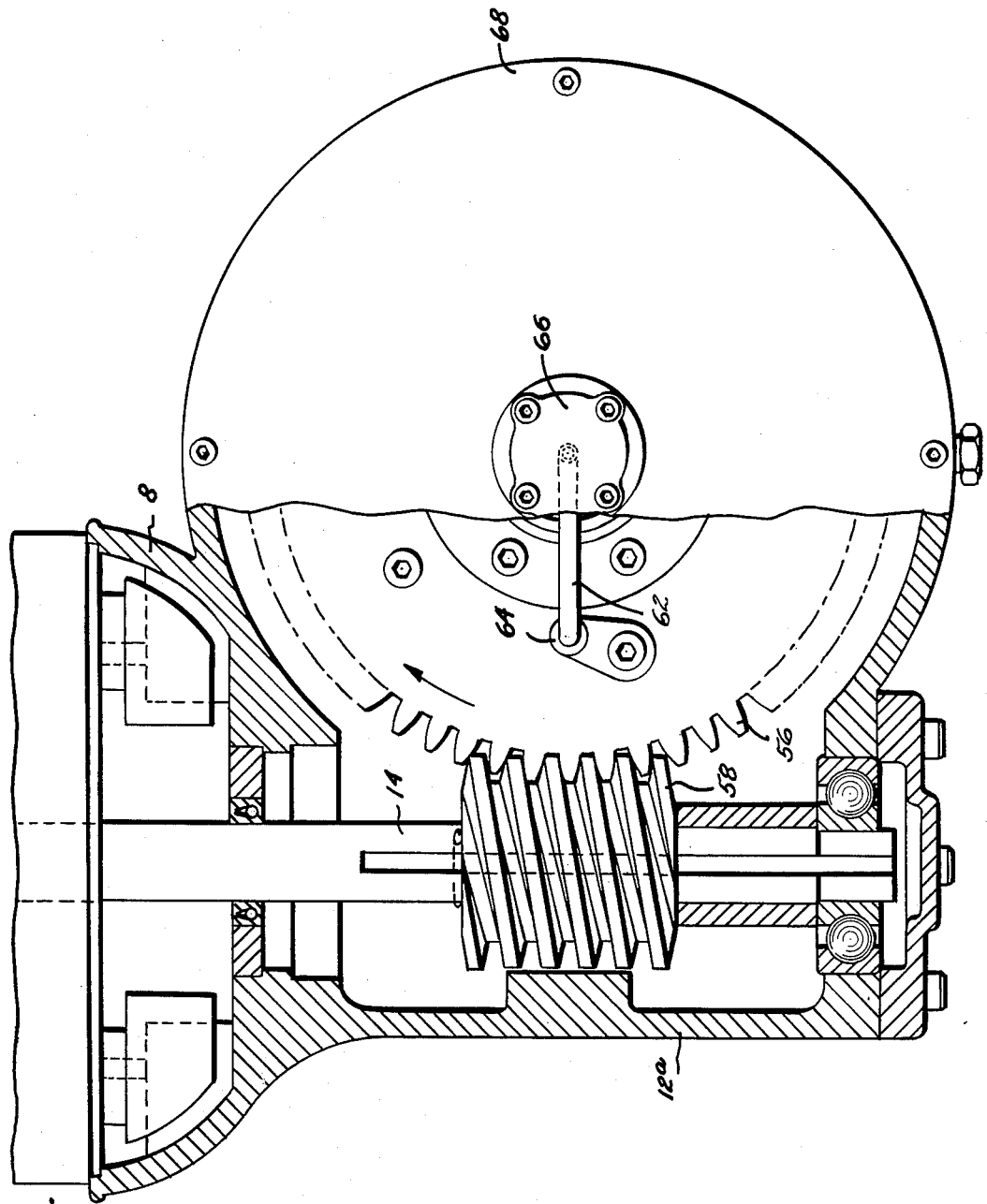
Figure 2:
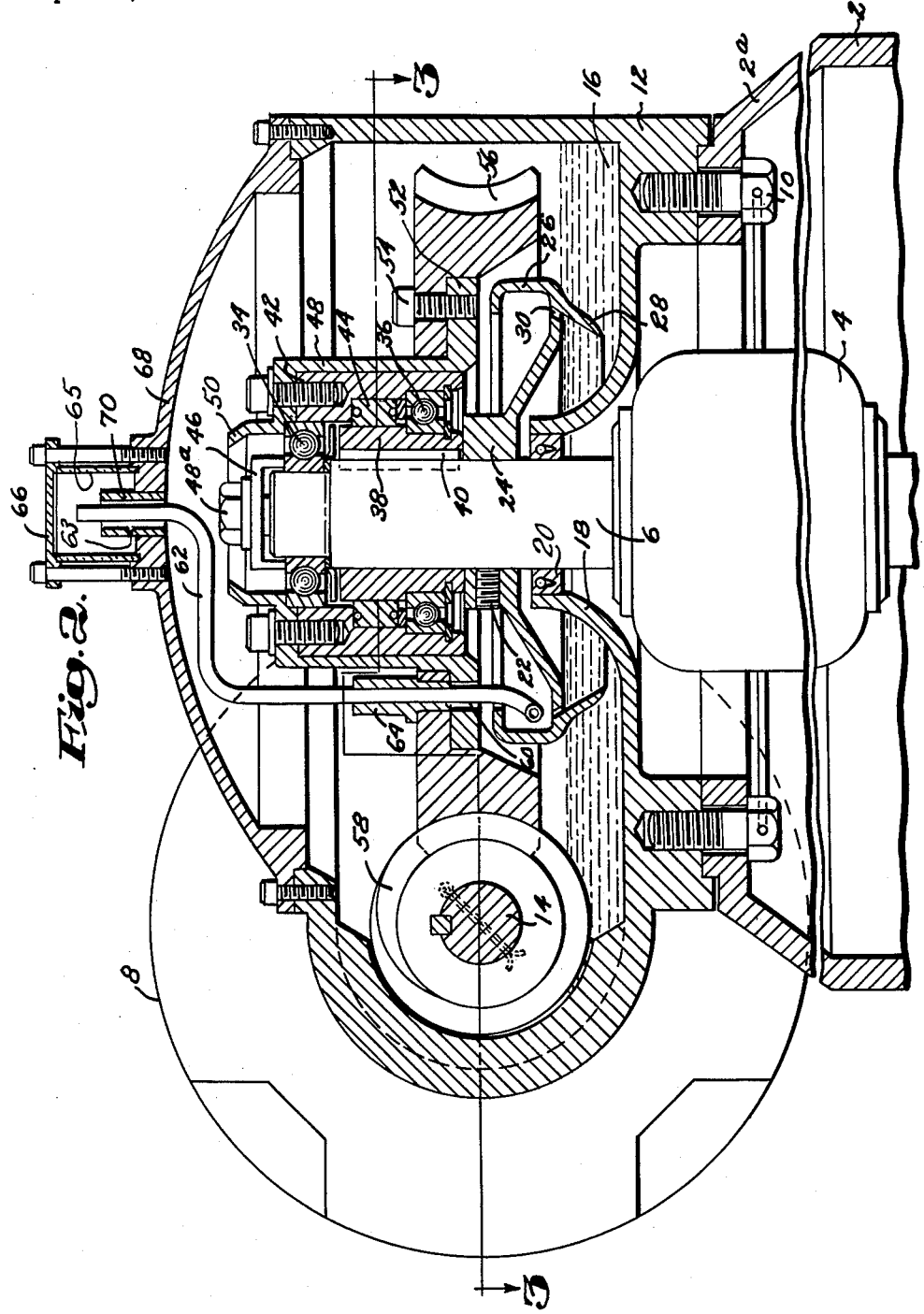
Figure 3:
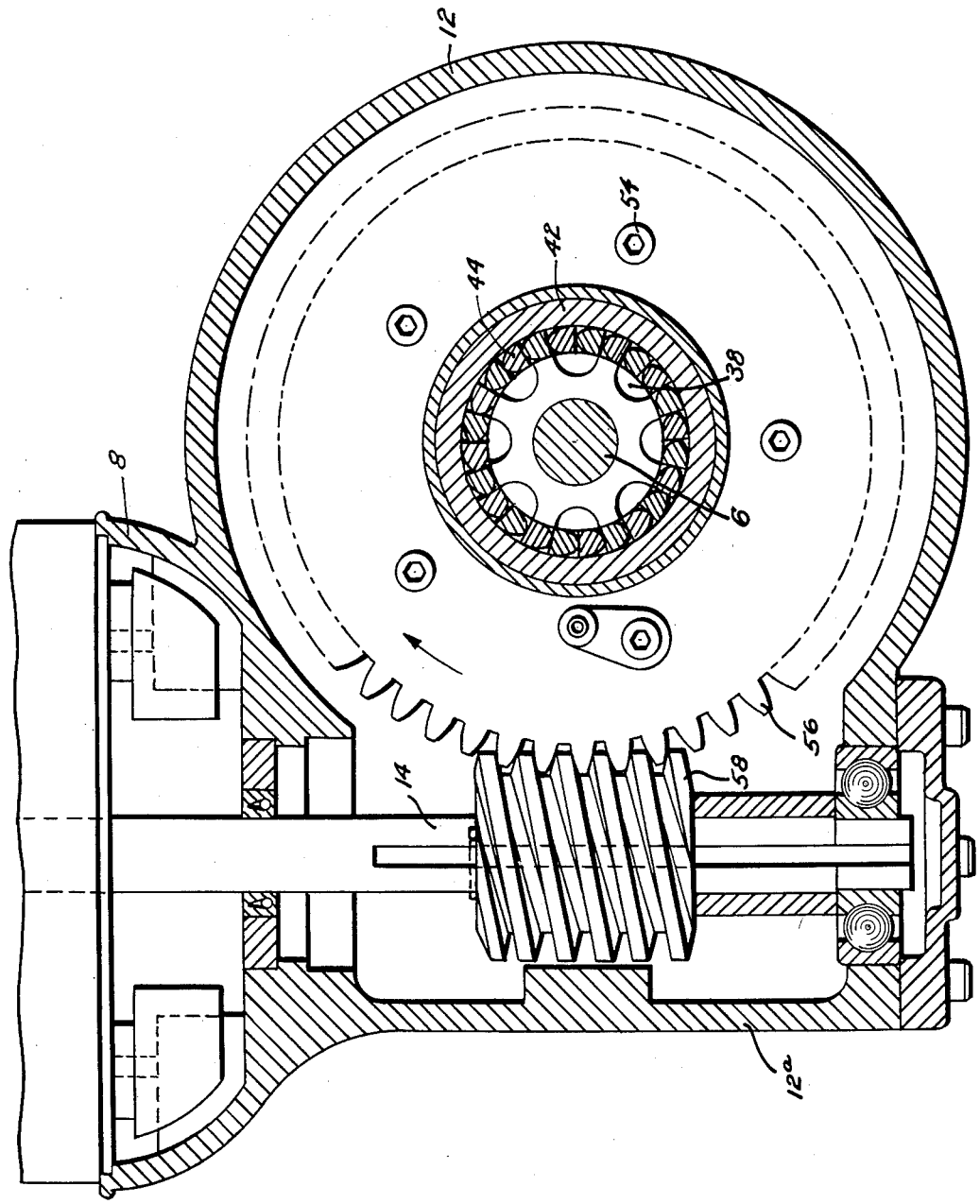

These and other objects and novel features will be more fully understood and appreciated from the following description of a preferred embodiment of the invention selected for purposes of illustration and shown in the accompanying drawings, in which Fig. 1 is a plan view, partly in cross-section, showing an unloading drive mechanism as employed in the invention;

Fig. 2 is a central, vertical, cross-section of parts of the main driving mechanism and further showing, in cross-section, the unloading drive in association therewith; and Fig. 3 is a cross-sectional view taken on the line 3—3 of Fig. 2.

In the structure shown in the accompanying drawings, numeral 2 denotes fragmentarily, in cross-section, a portion of a centrifugal separator structure comprising an upper section thereof in which is supported a main driving motor 4, also indicated fragmentarily. Reference is had especially to the type of centrifugal separator in which the basket portion of the separator, not shown in the drawings, is driven by a central vertically disposed shaft 6 which is rotated by means of the motor 4. It may be assumed, therefore, that a basket and protective curb of the conventional form is located around the lower end of the shaft 6.

This shaft member extends through the motor 4 and is normally free to turn about its own axis. However, when the motor 4 is energized it operates to rotate this shaft at conventionally rotative speeds which may run from a few hundred R. P. M. up to several thousand R. P. M. As illustrated in Fig. 2 the upper end of the shaft 6 projects through the motor 4 to receive an auxiliary driving apparatus which is powered by a second electrical motor 8, also shown in Figs. 1 and 3. This auxiliary driving member 8 is normally operated at very much lower speeds as, for example, 45 or 50 R. P. M., and constitutes what is commonly referred to as the "unloading drive" for the centrifugal separator.

Mounted on an upper tapered section 2a of the motor supporting structure 2, and solidly secured by bolts 10, is a casing or housing 12 which is of a generally circular shape and is constructed at one side with a casing extension 12a into which projects a driving shaft 14 from the motor 8, as may be better seen in Figs. 1 and 3. The lower portion of this casing 12 comprises an oil well 16 in which a body of oil, illustrated diagrammatically in Fig. 2, may be maintained at approximately the level indicated therein. The shaft 6 is maintained in sealed relation with respect to oil in the well 16 by means of a neck portion 18, within which is secured a sealing member 20, as noted in Fig. 2.

Secured in fixed relationship around the shaft extension 6 by means of a set screw 22 is an annular oil trapping member 24 having an annular oil receptacle 26 former therein. This receptacle is open at its upper side, and at its under side is constructed with an angularly extending annular flange 28 which, as noted in Fig. 2, is arranged to extend downwardly into the body of oil in the oil well 16. When the oil trapping member is rapidly revolved with the shaft 6 to which it is attached, the oil trapping flange 28 operates to force oil outwardly and upwardly, and to take advantage of this movement of oil there has been provided oil passageways 30 which lead from the oil well into the interior of the annular receptacle 26.

Mounted around the shaft 6 above the oil trapping member is an overrunning clutch mechanism which is rotatably received on upper ball bearings 34 and lower ball bearings 36. This overrunning clutch mechanism includes an inner race 38 which is secured by a key 40 to the shaft. An outer race 42 is rotatably supported around the bearing 36 and supports between itself and the inner race a series of spring-held sprags 44 which operate in the well known manner to comprise an overrunning clutch. When a torque force is applied in one direction the sprags lock and cause the clutch to engage with the shaft 6. Rotation of the shaft in an opposite direction releases the sprags and permits them to turn independently of the race 42.

The ball bearing member 34 is received about a shouldered portion formed at the upper end of the shaft 6, as suggested in Fig. 2, and a bearing holder 46 is normally maintained by a bolt 48a which is threaded into an opening in the top of the shaft 6. Received on the outer race shell of the bearing 34 is a cylindrical holder 48 which also engages against and rests upon the outer race 42 of the clutch. This cylindrical holder at its upper end has inwardly tapering edges 50 which constitute a cup surrounding the top of the shaft 6 and the bearing structure 34. At its lower end the cylindrical member 48 has an annular rim 52 on which is bolted by a threaded bolt 54 a worm wheel 56. This worm wheel is adapted to engage with and be driven by a worm 58 keyed to the shaft 14 earlier noted.

The cylindrical member 48 is further formed with an opening 60 through which extends a conduit 62 received through a fitting 64. The lower end of this fitting is tightly engaged in an opening provided therefor in the worm wheel 56. The pipe or conduit 62 extends downwardly, into the annular receptacle 30 in the manner shown in Fig. 2 in a position such that it may lie in the path of movement of a circular stream of oil which is carried around in the annular receptacle when the shaft 6 is being rotated. Oil thus collected in the conduit 62 is forced upwardly through the pipe and passes into a reservoir structure 66 located at the upper side or cover portion 68 of the housing. In this reservoir is an overflow pipe 70 which serves as a passageway between the reservoir chamber and the space within the casing. The overflow pipe 70 is of a diameter slightly exceeding the outer diameter of the conduit 62, thus providing an annular passageway through which oil rising up around the overflow pipe may escape and drop downwardly on to the shaft 6 and through the cup portion 50 formed therearound. Thereafter oil thus seeping down through the clutch mechanism ensures a thorough and complete lubrication of all of the working parts, irrespective of which particular drive is in operation.

The reservoir structure preferably includes a cap piece which holds in place a tubular glass body portion 65. The presence of the glass tubular body provides for a visual inspection of the oil supply at any time. We may also employ on the overflow pipe 70 a small orifice 63 which extends transversely through the pipe 70 at a point just above the bottom of the oil reservoir member and in the event that oil pumping stops there is thus provided a gradual seepage of oil occurring below the top of the overflow pipe 70.

While a preferred embodiment of the invention has been shown and described, it should be understood that various changes and modifications may be resorted to as defined by the scope of the appended claim.

Having thus described our invention, what we desire to claim as new is:

In a centrifugal separator, a vertically disposed main driving shaft, an electrical motor having the shaft received therethrough and free to turn about its own axis, said motor when energized being adapted to rotate the shaft at relatively high operating speeds, a casing mounted on the separator and enclosing the upper end of said shaft, a second electrical motor supported at one side of the casing and operatively connected to the driving shaft for rotating the said shaft independently of the first motor at a relatively low unloading speed, said casing being formed with an annular oil well portion for holding lubricating oil, means for maintaining the shaft in sealed relationship with respect to oil contained in the said oil well, an oil trapping device fixed to said shaft, said oil trapping device presenting an oil trapping flange extending downwardly into the oil well, said oil trapping member further being formed with oil passageways adapted to pass oil collected by the oil trapping flange into the oil trapping member, and means for conducting oil from the oil trapping member to points above the said shaft.

References Cited in the file of this patent

UNITED STATES PATENTS

| | | |
|---|---|---|
| 847,203 | Reist | Mar. 12, 1907 |
| 2,149,580 | Collins | Mar. 7, 1939 |
| 2,327,962 | Drake | Aug. 24, 1943 |
| 2,551,980 | Tholl | Feb. 5, 1946 |
| 2,649,929 | Wood | Aug. 25, 1953 |

FOREIGN PATENTS

| | | |
|---|---|---|
| 221,465 | Great Britain | Dec. 18, 1924 |
| 275,917 | Switzerland | Sept. 1, 1951 |
| 617,253 | Germany | Aug. 15, 1935 |